(12) United States Patent
Gupta (10) Patent No.: US 8,946,990 B1
(45) Date of Patent: Feb. 3, 2015

(54) VEHICLE HEADLIGHT DETECTION SYSTEM

(71) Applicant: Nissan North America, Inc., Franklin, TN (US)

(72) Inventor: Balkishan Malay Gupta, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 14/075,689

(22) Filed: Nov. 8, 2013

(51) Int. Cl.
*B60Q 1/02* (2006.01)
*B60Q 1/04* (2006.01)

(52) U.S. Cl.
CPC .......................................... *B60Q 1/04* (2013.01)
USPC ............................ 315/82; 250/208.2; 340/438

(58) Field of Classification Search
USPC .................... 315/82; 250/208.2; 340/435, 438
See application file for complete search history.

(56) References Cited

U.S. PATENT DOCUMENTS

| | | | |
|---|---|---|---|
| 3,278,895 A | 10/1966 | Pfund | |
| 4,037,197 A | 7/1977 | Courty | |
| 4,443,057 A | 4/1984 | Bauer et al. | |
| 4,734,697 A | 3/1988 | Robinson et al. | |
| 5,113,175 A | 5/1992 | Adell | |
| 5,212,468 A | 5/1993 | Adell | |
| 5,347,261 A | 9/1994 | Adell | |
| 5,796,094 A * | 8/1998 | Schofield et al. | 250/208.1 |
| 6,727,808 B1 | 4/2004 | Uselmann et al. | |
| 7,355,524 B2 | 4/2008 | Schofield | |
| 2012/0062746 A1* | 3/2012 | Otsuka et al. | 348/148 |
| 2014/0081517 A1* | 3/2014 | Barrett et al. | 701/36 |
| 2014/0204212 A1* | 7/2014 | Pawlicki et al. | 348/148 |

FOREIGN PATENT DOCUMENTS

| | | | |
|---|---|---|---|
| DE | 3332998 A1 | 3/1985 | |
| DE | 3629007 A1 | 3/1988 | |

* cited by examiner

*Primary Examiner* — Don Le
(74) *Attorney, Agent, or Firm* — Global IP Counselors, LLP (57) ABSTRACT

A vehicle headlight detection system includes a vehicle sensor, a light sensor, and a controller. The vehicle sensor is configured to detect a remote vehicle approaching the vehicle sensor. The light sensor is configured to detect a light output of the remote vehicle. The controller is programmed to determine, based on the light output detected by the light sensor, whether the light output of the remote vehicle meets a predetermined minimum condition when the vehicle sensor detects the remote vehicle, and programmed to communicate with an indicator to notify a driver of the remote vehicle when the light output of the remote vehicle does not meet the predetermined minimum condition.

20 Claims, 13 Drawing Sheets

VEHICLE HEADLIGHT DETECTION SYSTEM

BACKGROUND

1. Field of the Invention

The present invention generally relates to a vehicle headlight detection system. More specifically, the present invention relates to a vehicle headlight detection system that enables a remote system to determine whether a vehicle's headlights are producing the appropriate light and notify the driver of the vehicle when the headlights are not producing the appropriate amount of light.

2. Background Information

Conventional headlight activators are known in the art. For example, one conventional device activates vehicle headlights whenever the windshield wipers of a vehicle are energized. Another conventional device activates and deactivates vehicle headlights whenever ambient light conditions fall below or exceed predetermined values. That is, the headlights will be automatically activated when a certain level of darkness is reached and will be automatically deactivated when a certain level of lightness is reached.

Additionally, a manually controlled system that allows a driver to warn other drivers when their vehicle lights are out or too bright exists. This system includes a high intensity beam that the driver can flash toward oncoming vehicles, a pair of signal lights that the driver can alternatingly flash toward rearward vehicles and a control unit for the high intensity beams and signal lights.

Accordingly, to further encourage proper use of vehicle headlights, a need exists for an improved vehicle headlight system.

SUMMARY

It has been discovered that to improve vehicle headlight systems, a system may include the capability of determining whether the light output of a remote vehicle meets a predetermined minimum condition, and of notifying a driver of the remote vehicle that the light output of the remote vehicle does not meet the predetermined minimum condition. In one disclosed embodiment, the vehicle headlight detection system comprises a vehicle sensor, a light sensor, and a controller. The vehicle sensor is configured to detect a remote vehicle approaching the vehicle sensor. The light sensor is configured to detect a light output of the remote vehicle. The controller is programmed to determine, based on the light output detected by the light sensor, whether the light output of the remote vehicle meets a predetermined minimum condition when the vehicle sensor detects the remote vehicle, and programmed to communicate with an indicator to notify a driver of the remote vehicle when the light output of the remote vehicle does not meet the predetermined minimum condition.

In another embodiment, the vehicle headlight detection system comprises a vehicle sensor, a light sensor, a controller and an indicator. The vehicle sensor is configured to detect one of a remote vehicle approaching a host vehicle equipped with the vehicle headlight detection system or the host vehicle approaching the remote vehicle. The light sensor is configured to detect a light output of the remote vehicle. The controller is programmed to determine, based on the light output detected by the light sensor, whether the light output of the remote vehicle meets a predetermined minimum condition when the vehicle sensor detects the remote vehicle. The indicator is configured to notify a driver of the remote vehicle when the predetermined minimum condition is not met.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
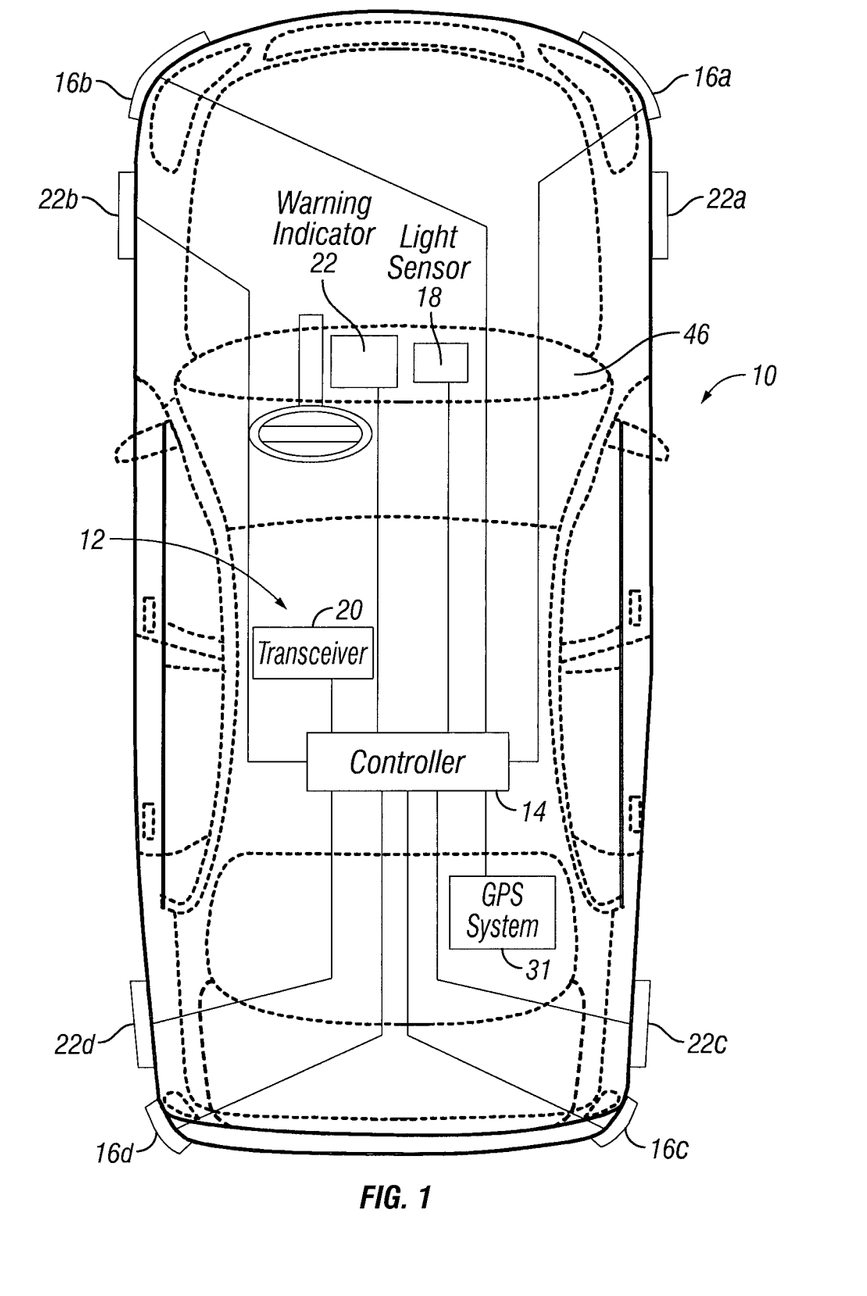
FIG. 1 is a plan view of a vehicle equipped with a vehicle headlight detection system in accordance with one disclosed embodiment.
Figure 2:
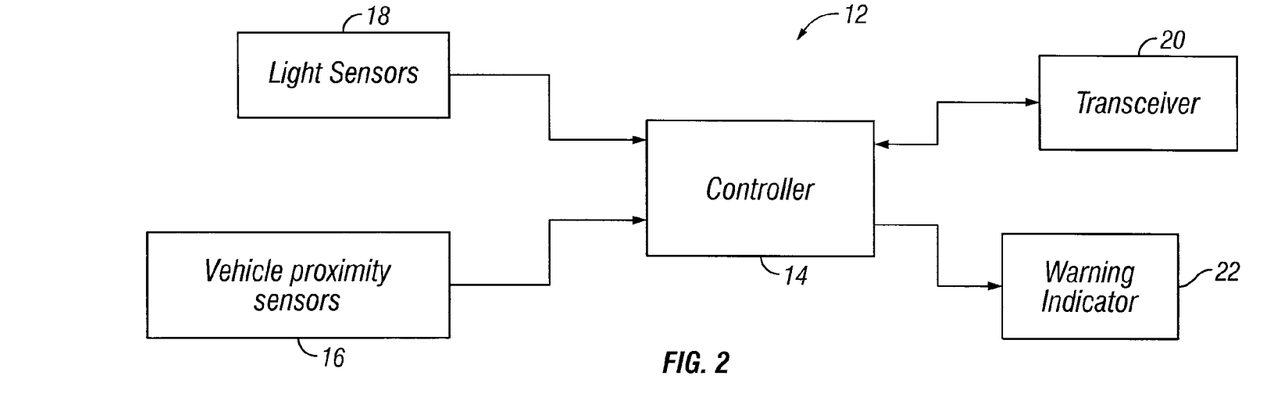
FIG. 2 schematically illustrates a vehicle headlight detection system in accordance with one disclosed embodiment.

Referring initially to FIGS. 1 and 2, a headlight detection system 12 is illustrated in accordance with a first embodiment. The vehicle headlight detection system in this embodiment is disposed in a host vehicle 10 and may include a controller 14, a remote vehicle detection system 16, light sensors or light sensing system 18, a transceiver 20 and a warning indicator or warning indication system 22. As discussed in more detail below, the remote vehicle detection system 16 may be disposed in a static device, such as a road sign 24 (see, e.g., FIGS. 7 and 8), or other device in the vicinity of a road or area in which a vehicle may pass.

The controller 14 preferably includes a microcomputer with a control program that controls the headlight detection system 12 as discussed below. The controller 14 can also include other conventional components such as an input interface circuit, an output interface circuit, and storage devices such as a ROM (Read Only Memory) device and a RAM (Random Access Memory) device. The microcomputer of the controller 14 is programmed to control one or more of the remote vehicle detection system 16, the light sensor 18, the transceiver 20 and the warning indicator 22. The memory circuit stores processing results and control programs, such as ones for operation of the remote vehicle detection system 16, light sensor 18, transmitter 20 and warning indicator 22 that are run by the processor circuit. The controller 14 is operatively coupled to the remote vehicle detection system 16, the light sensor 18, the transmitter 20 and the warning indicator 22 in a conventional manner. The internal RAM of the controller 14 stores statuses of operational flags and various control data. The internal ROM of the controller 14 stores the information for various operations. The controller 14 is capable of selectively controlling any of the components of the headlight detection system 12 in accordance with the control program. It will be apparent to those skilled in the art from this disclosure that the precise structure and algorithms for the controller 14 can be any combination of hardware and software that will carry out the functions of the present invention.

In one disclosed embodiment, the remote vehicle detection system 16 includes a plurality of remote vehicle sensors 16a, 16b, 16c and 16d, and is configured to detect a remote vehicle in proximity to the headlight detection system 12. For example, as illustrated in FIG. 1, the remote vehicle sensors 16a, 16b, 16c and 16d are preferably mounted externally on the host vehicle 10. However, the sensors may be mounted to any suitable portion of the host vehicle 10, including the front and rear quarter panels, the bumpers, the external mirrors or any combination of suitable areas. The front sensors 16a and 16b can include a long-range radar device for object detection in front of the host vehicle 10. For example, the front sensors 16a and 16b may be configured to detect objects at a predetermined distance (e.g., distances up to 200 m), and thus may have a narrow field of view angle (e.g., around 15°). Due to the narrow field of view angle, long range radar may not detect all objects in the front of the host vehicle 10. Thus, if desired, the front corner sensors 16a and 16b can include short-range radar devices to assist in monitoring the region in front of the host vehicle 10, each having a 60° field of view angle and 40 m detection range in one embodiment. The rear sensors 16c and 16d may include short-range radar devices to assist in monitoring oncoming traffic beside and behind the host vehicle 10, each having a 60° field of view angle and 40 m detection range in one embodiment. Placement of the aforementioned sensors permits monitoring of traffic flow including remote vehicles and other objects around the host vehicle 10. However, the sensors 16a, 16b, 16c and 16d can be disposed in any position on the host vehicle 10 and may include any type and/or combination of sensors. The sensors may be cameras, radar sensors, photo sensors or any combination thereof. Although FIG. 1 illustrates four sensors, there can be as few or as many sensors as desirable or suitable.

The sensors 16a, 16b, 16c and 16d can be electronic detection devices that transmit either electromagnetic waves (e.g., radar) or take computer-processed images with a digital camera and analyze the images or emit lasers, as is known in the art. The sensors may be capable of detecting at least the speed, direction, yaw, acceleration and distance of the remote obstacle relative to the host vehicle 10. Further, the sensors may include object-locating sensing devices including range sensors, such as FM-CW (Frequency Modulated Continuous Wave) radars, pulse and FSK (Frequency Shift Keying) radars, sonar and Lidar (Light Detection and Ranging) devices, and ultrasonic devices which rely upon effects such as Doppler-effect measurements to locate forward objects. Object-locating devices may include charged-coupled devices (CCD) or complementary metal oxide semi-conductor (CMOS) video image sensors, and other known camera/video image processors which utilize digital photographic methods to "view" forward objects including one or more remote vehicles. The sensors 16a, 16b, 16c and 16d are in communication with the controller 14 and are capable of transmitting information to the controller 14. Thus, the controller 14 is programmed to determine at least if a remote vehicle is present based on the information supplied by the remote vehicle detection system 16.

Figure 3:
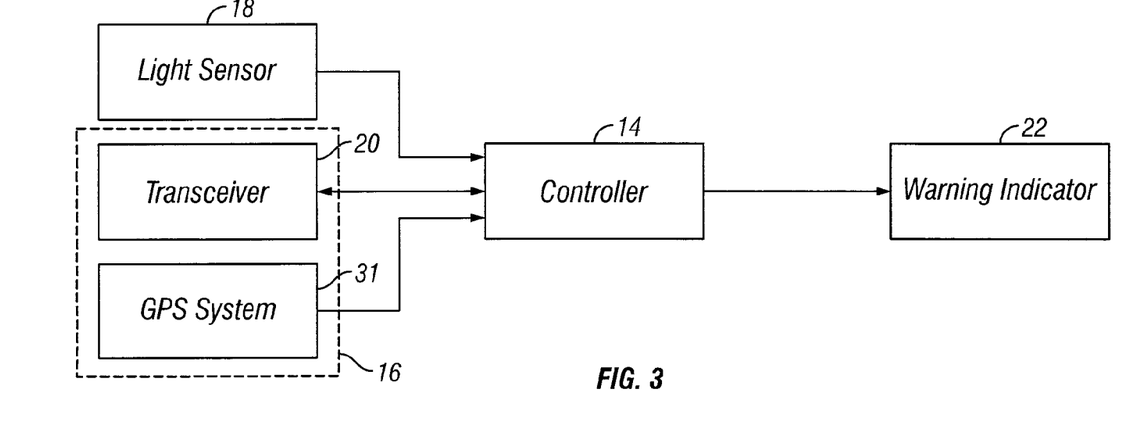
FIG. 3 schematically illustrates a vehicle headlight detection system in accordance with another disclosed embodiment.

In one embodiment as shown in FIG. 3, the headlight detection system 12 can use a transceiver 20 to send and/or receive messages. For example, the system can employ vehicle-to-vehicle communications, as is known in the art, or the headlight detection system 12 can use send and receive similar messages to a road sign or other stationary object alongside or adjacent to a road.

The transceiver 20 can include a DSRC antenna that receives 5.9 GHz DSRC signals 34 from a two-way wireless communications network 36. Thus, the transceiver 20 can receive signals from and transmit signals to the controller 14. These DSRC signals 34 can include basic safety messages (BSMs) that include information which, under certain circumstances, warns drivers of imminent vehicle contact in time for the driver of the host vehicle 10 to take appropriate action to avoid the vehicle contact. In the disclosed embodiments, a BSM includes information in accordance with SAE Standard J2735 as can be appreciated by one skilled in the art.

Accordingly, the host vehicle 10 can receive BSM signals 38 from a remote vehicle 40, including information pertaining to vehicle latitude, vehicle longitude, vehicle elevation, position accuracy, vehicle speed, vehicle heading, vehicle steering wheel angle, vehicle acceleration (e.g., lateral, longitudinal, vertical and yaw rate), vehicle brake status, vehicle size, vehicle location, the vehicle intended next maneuver, and vehicle headlight status.

Additionally, the headlight detection system 12 may include a BSM classification application capable of, for example, caching BSM messages received from one or more remote vehicles 40 in a cache table, which can also be referred to as a lookup table. The cache table can include information representing the remote vehicle headlight status, among other information, such as remote vehicle intended next maneuver, the remote vehicle location, and any other suitable information included in the BSMs which can then be retrieved for use as discussed herein. Also, the controller 14 can receive and process BSMs from many remote vehicles 40 at the same time. For example, the controller 14 can receive and process BSMs from 100 remote vehicles 40, or any other suitable number of remote vehicles 40, at the same time. Upon receiving a BSM from a remote vehicle 40, the controller 14 can determine whether the remote vehicle 40 has insufficient light output. If the remote vehicle 40 does not have insufficient light output, the controller 14 can, for example, discard the data included in the BSM. The controller 14 can also discard a BSM from the cache after a period of time, for example, 5 seconds or any suitable length of time.

Figure 4:
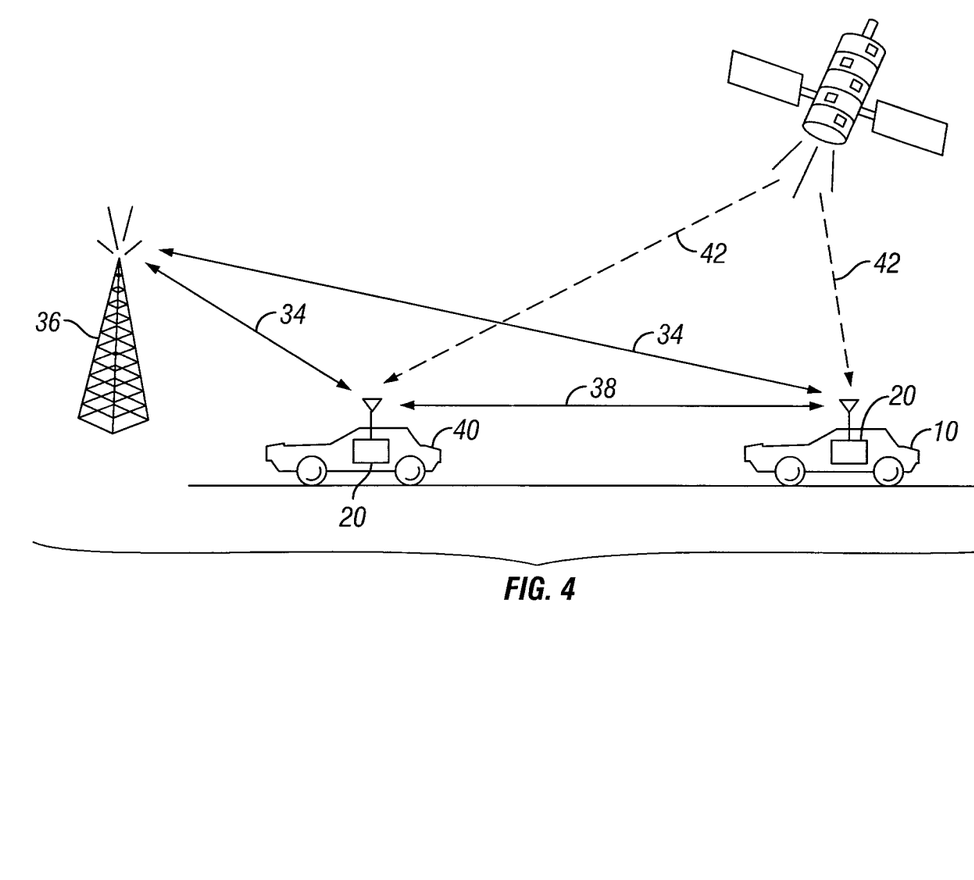
FIG. 4 illustrates GPS and other wireless signal transmissions in accordance with a disclosed embodiment.

Moreover, the headlight detection system 12 may utilize a GPS 31, as illustrated in FIGS. 3 and 4. The GPS 31 preferably includes a GPS antenna and a GPS receiver. In this example, as illustrated in FIG. 4, the host vehicle 10 receives a GPS satellite signal 42. As is understood, the GPS 31 processes the GPS satellite signal 42 to determine positional information (such as location, speed, acceleration, yaw, and direction, just to name a few) of the host vehicle 10. Thus, in one example, the GPS 31 can determine whether the host vehicle 10 is on a road with 2 or more lanes in the direction of travel of the host vehicle 10. Thus, the GPS 31 may activate the headlight detection system 12 when the number of lanes is determined to be 2 or more in the direction of travel of the host vehicle 10, or when the host vehicle 10 is on a road with 3 or more total lanes, or in any other desired situation. Also, a GPS antenna and a DSRC antenna can be configured as a dual frequency antenna as understood in the art.

In one embodiment, light sensor 18 may be a photoelectric sensor, a photocell, a light-dependent resistor, or any other suitable device. As discussed herein, the light sensor 18 is used to detect ambient light or brightness in a manner similar to a human eye. In one embodiment, the ambient light sensor 18 provides an input signal to the controller 14 that is indicative of the ambient light conditions in and around the host vehicle 10.

As illustrated in FIG. 1, the light sensor is preferably located on the dashboard 46 or another forward portion of an instrument panel. The light sensor 18 may be a dual purpose sensor in that it is capable of determining ambient lighting conditions for the purpose of activating headlights, as is known in the art, and for the purpose of executing operation of the vehicle headlight detection system 12 as described herein. Of course, the host vehicle 10 can have separate sensors for each of these purposes or the host vehicle 10 may have only the vehicle headlight detection system 12 in the absence of a conventional auto light feature.

Additionally, the host vehicle 10 may have further light sensors 18 on the exterior of the vehicle 10. The exterior sensors may be mounted on any suitable external portion of the host vehicle 10, including the front and rear quarter panels, the bumpers, the external mirrors or any combination of suitable areas.

Figure 5:
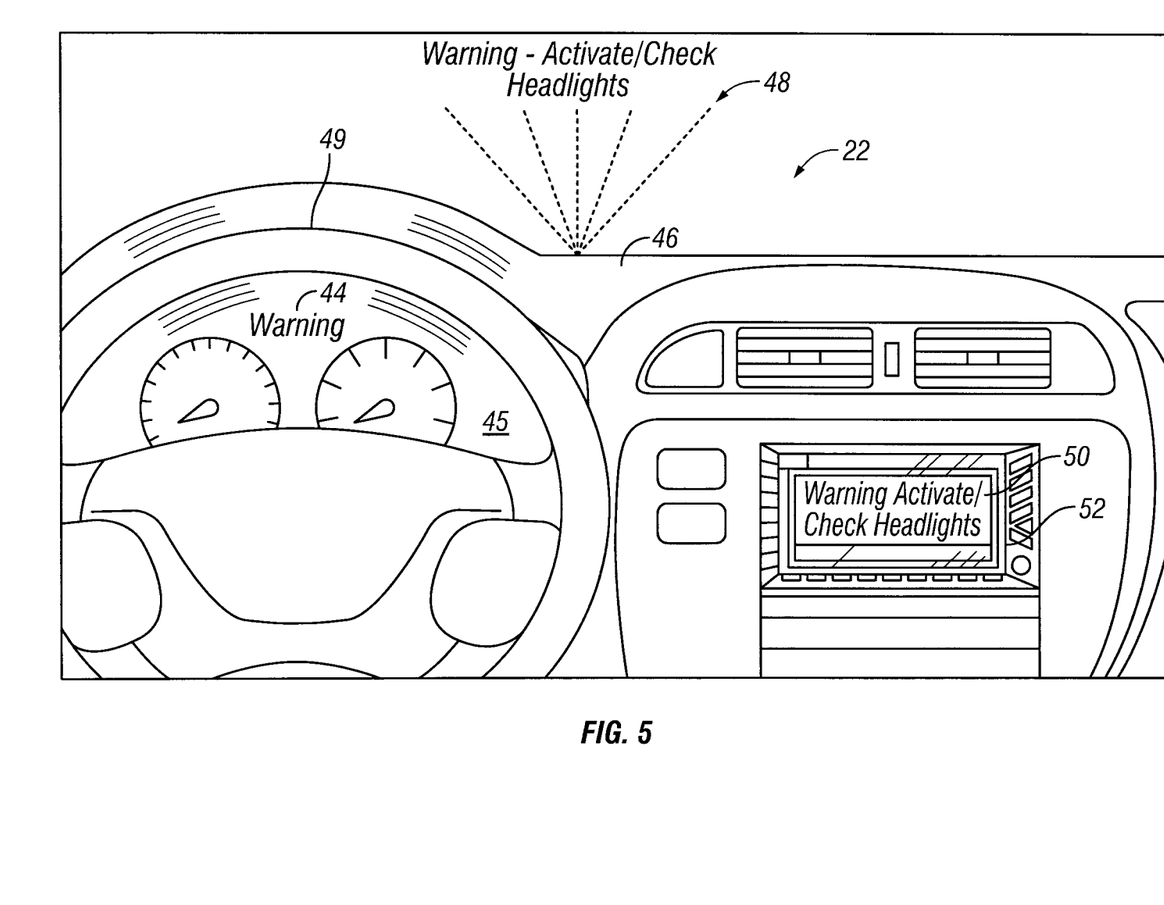
FIG. 5 is a partial interior view of the warning system in a remote vehicle in accordance with one disclosed embodiment.

Turning to FIG. 5, one embodiment of the warning indication system 22 is illustrated. As shown in FIG. 5, the warning indication system 22 may include a visual display or indicator 44 that flashes or illuminates the instrument cluster 45 on the dash board 46 of the remote vehicle 40, activates a heads-up display 48, is a visual readout 50 in an information display unit 52, or any other suitable visual display or audio indicator that notifies the driver or interior occupant of the remote vehicle 40 that light output from the headlights of the remote vehicle 40 is insufficient. The warning indication system 22 may also include tactile feedback generated by a vibration actuator in the steering wheel 49, the driver seat, or any other suitable location within the remote vehicle 40.

As illustrated in FIG. 1, the warning indication system 22 can include external lights or indicators 22*a*, 22*b*, 22*c* and 22*d* mounted or disposed on the exterior of the host vehicle 10. The external warning lights 22*a*-*d* may be mounted on any suitable external portion of the host vehicle 10, including the front and rear quarter panels, the bumpers, the external mirrors or any combination of suitable areas. The external warning indication system 22 can further comprise existing headlights of the host vehicle 10, an externally mounted LED having a conspicuous color or any other suitable means to alert the driver of the remote vehicle 40.

Referring now to FIGS. 7, 8 13 and 14, a vehicle headlight detection system 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

Figure 13:
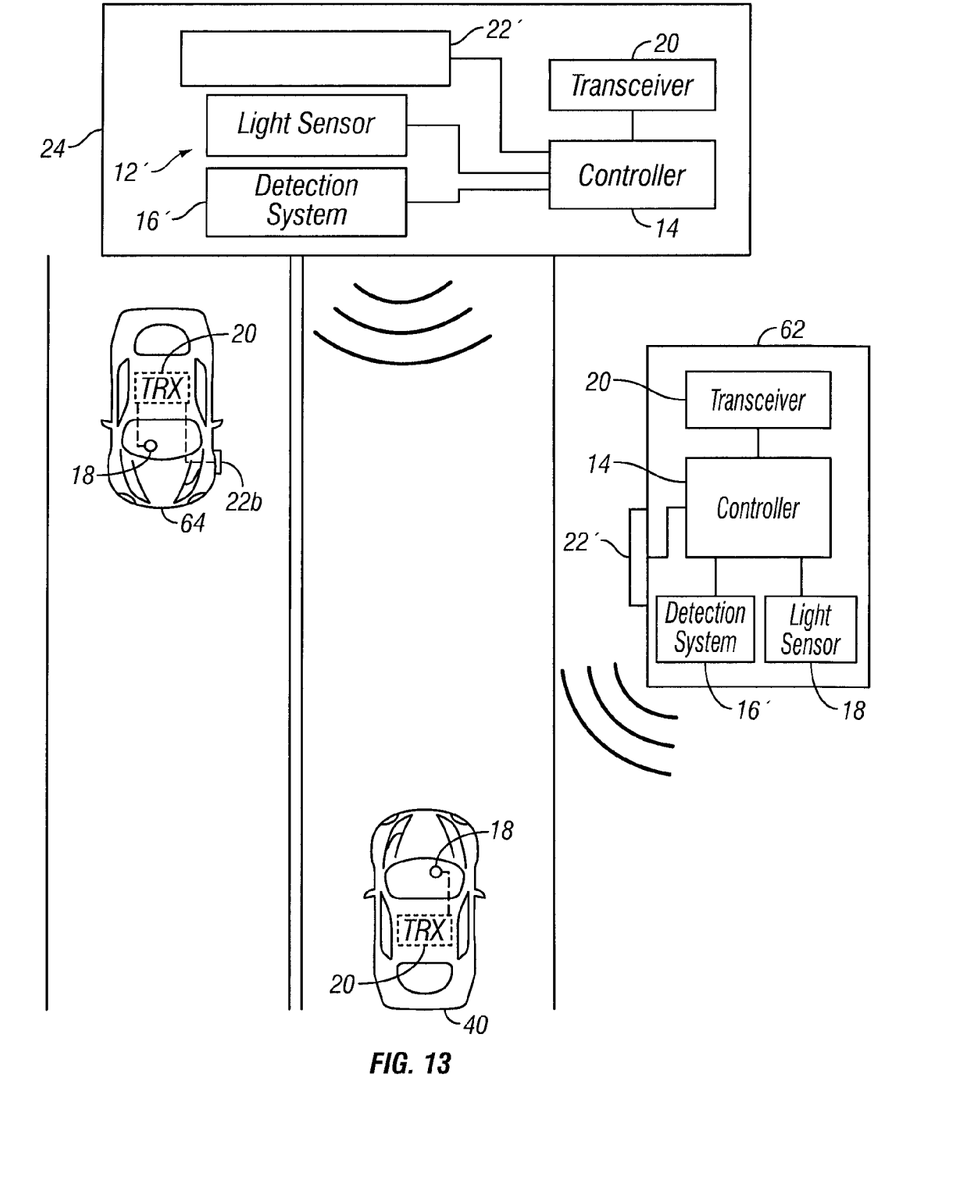
FIGS. 13 and 14 illustrate an exemplary scenario in which a static device or road sign equipped with a vehicle headlight detection system according to a disclosed embodiment notifies a remote vehicle of insufficient light output or causes an adjacent vehicle to notify the remote vehicle of insufficient light output.
Figure 14:
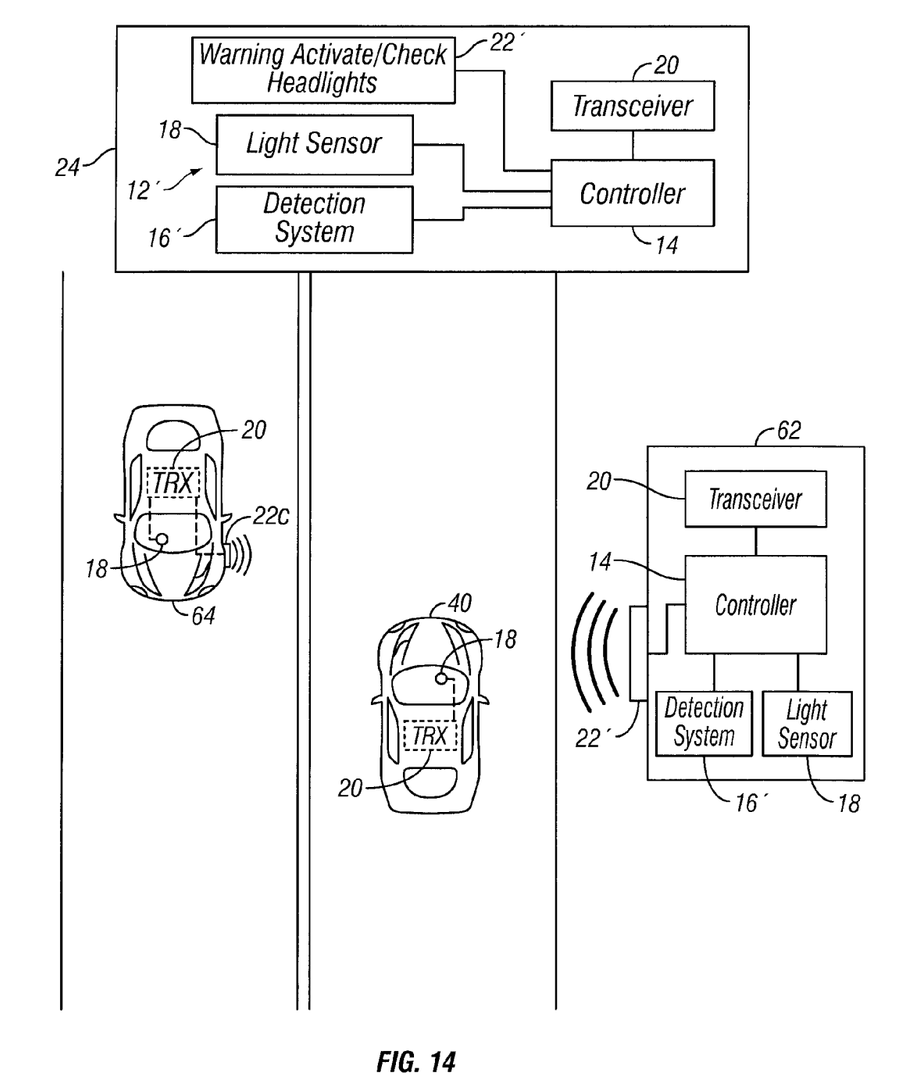

As illustrated in FIGS. 13 and 14, the headlight detection system 12' includes the controller 14, a remote vehicle detection system 16', the light sensor 18, the transceiver 20, and a warning indicator 22'. In this embodiment, the headlight detection system 12' can be disposed in a road sign 24 or a road side stationary device 62.

The remote vehicle detection system 16' is similar to remote vehicle detection system 16 in that the remote vehicle detection system 16' can include a long-range radar device for object detection. The remote vehicle detection system 16' may be a radar sensor configured to detect objects at a predetermined distance (e.g., distances up to 200 m), and thus may have a narrow field of view angle (e.g., around 15°). Due to the narrow field of view angle, long range radar may not detect all objects in the front of the system 12'. Thus, if desired, the remote vehicle detection system 16' can include short-range radar devices to assist in monitoring the region in front of the system 12', each having a 60° field of view angle and 40 m detection range in one embodiment.

Figure 8:
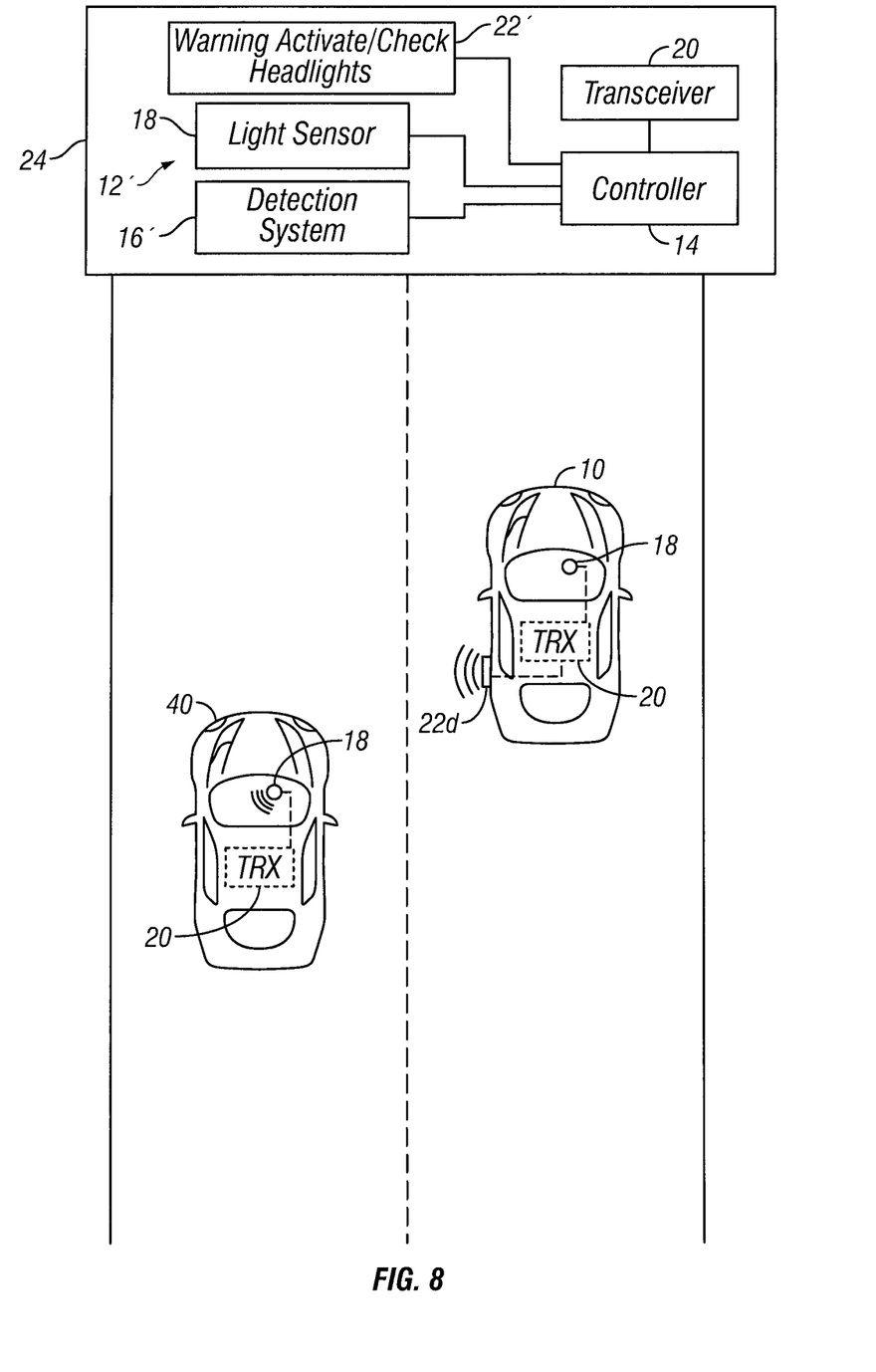

Additionally, as shown in FIGS. 8 and 14, when in a road sign 62, the warning indicator 22' can include a visual display capable of visually communicating a message such as "Warning, Activate/Check Headlamps!" Moreover, when in the stationary device 62, the warning indicator 22' may include a light similar to the external lights 22*a*, 22*b*, 22*c* and 22*d* on the host vehicle 10. However, the warning indicator 22' on the road sign 24 and the warning indicator 22' on the stationary device 62 may be any suitable visual indicator, such as a flashing light, a visual word display or any suitable display.

Figure 6:
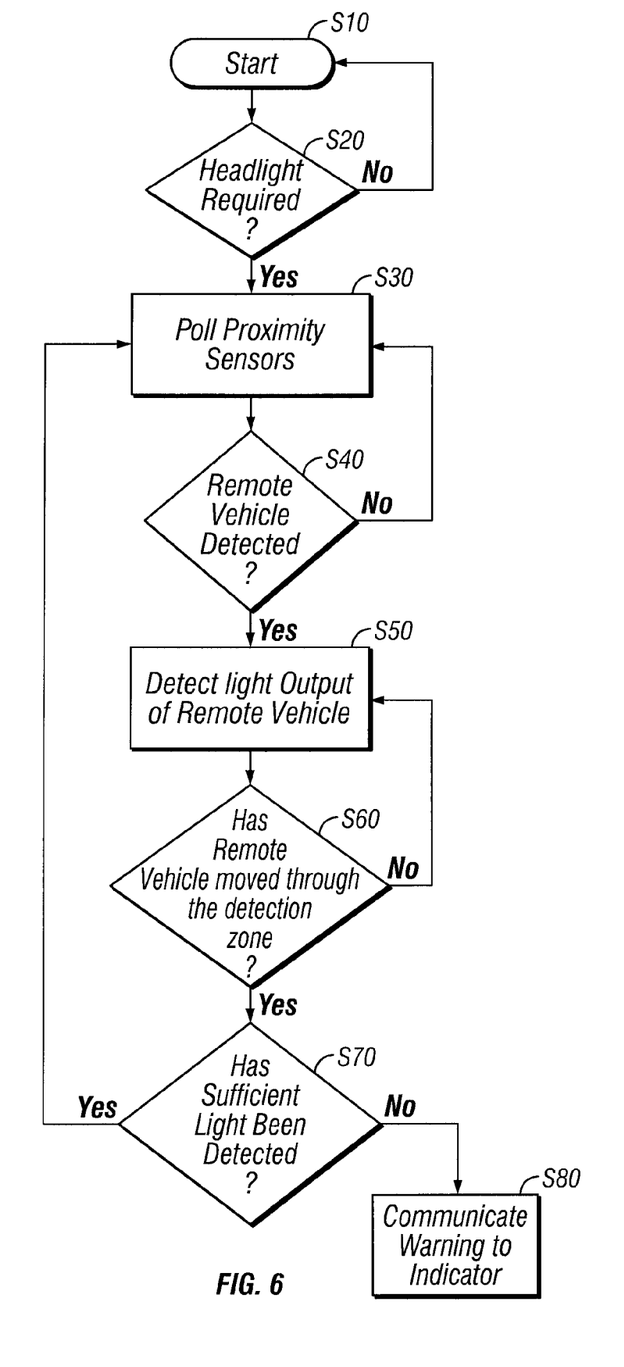
FIG. 6 is a flow chart illustrating steps executed by a controller according to a disclosed embodiment.

Generally, as illustrated in FIG. 6, when determining whether to activate the warning indicator 22 or 22', the controller 14 starts at step S10. The controller 14 then determines, based on the current state of ambient light, whether headlights should be used at step S20. In other words, the light sensor 18 detects ambient light surrounding or in the area adjacent to the host vehicle 10 and determines, based on the detected light level, whether headlights should be used. This can be based solely on an ambient lighting threshold or take other factors into consideration such as time of day and weather conditions. If headlights are not needed, control returns to step S10. If headlights should be used, the system polls the remote vehicle detection system 16 in step S30. The controller 14 then, based on the polling of the remote vehicle detection system 16 (e.g., proximity sensors), determines if the remote vehicle 40 is adjacent to the host vehicle 10 at step S40. As stated above, such a determination is made using the headlight detection system 12 and/or 12'.

If the remote vehicle 40 is not detected, control returns to step S50. If the remote vehicle 40 is detected, the remote vehicle detection system 16 indicates this to the controller 14. At step S50, the light sensor 18 determines whether the light output of the remote vehicle 40 is appropriate given the current ambient environment. That is, as stated above, the light sensor 18, prior to detection of the remote vehicle 40, determines the current ambient lighting conditions in the area surrounding the host vehicle 10, and whether, based on the detected ambient light level, headlights should be used. Thus, when it is determined that headlights should be used and the remote vehicle 40 is detected, the light sensors 18 determine the level of the ambient light as the remote vehicle 40 passes the headlight detection system 12 or 12'. At step S60, the controller 14, based on the remote vehicle detection system 16 determines whether the remote vehicle 40 has moved through a desired detection zone. For example, the remote vehicle detection system 16 can determine when the remote vehicle 40 completely passes or is completely passed by the host vehicle 10. If the remote vehicle 40 has not passed through the detection zone, the controller 14 continues to monitor the light output of the remote vehicle 40.

Once the remote vehicle 40 has passed through the detection zone, the controller 14 determines whether sufficient light from the remote vehicle 40 has been detected at step S70. That is, the controller 14 determines whether the detected level of light meets a prescribed level. For example, the prescribed level can be based on government regulations or conventionally accepted lighting standards and can vary depending on the driving environment, time of day, weather conditions, etc. In one embodiment the light sensor 18 is configured to take multiple readings within a predetermined period of time while the controller 14 determines the sufficiency of light output. Multiple readings can help to verify a static condition and minimize false readings caused by street lights, the headlights of other vehicles, etc. If a minimum level of light is detected, the controller 14 restarts the process by polling the remote vehicle sensors 16*a-d* at step S30. Note that detection of insufficient light output by the remote vehicle 40 can indicate that the headlights of the remote vehicle 40 have a burned out lamp, are turned off, or are malfunctioning in some other way.

If sufficient light is not detected, the controller 14 activates the warning indication system 22 in step S80. As discussed above, such communication may involve activating a light on the external surface of the host vehicle 10, activating a light in the remote vehicle 40, activating a light on the road sign 24 or other stationary device, and/or activating a light in another vehicle traveling adjacent to the remote vehicle 40.

In one embodiment, the GPS 31 and the transceiver 20 can be used in conjunction with or in place of the remote vehicle sensors 16*a-d* and the light sensor 18. In one embodiment the GPS 31 determines when the headlight detection system 12 is activated based on the number of travel lanes in the direction that the host vehicle 10 and/or the remote vehicle 40 are traveling. For example, the controller 14 can disable the headlight detection system 12 when a road includes only two total travel lanes and enable the headlight detection system when the road includes three or more total travel lanes or at least two travel lanes in the direction of travel of the host vehicle and/or the remote vehicle 40. However, the sensors and/or GPS may be used in any scenario desired.

Further, as discussed above, the headlight detection system 12 can determine the location of the remote vehicle 40 relative to the host vehicle 10, based on the GPS 31 and the information received by the transceiver 20 from the remote vehicle 40. Moreover, information received from the remote vehicle 40 may include the headlight status. Once the remote vehicle 40 is in proximity to the host vehicle 10 (determined by the GPS 31 and information received from the remote vehicle 40 and/or information from the remote vehicle sensors 16*a-d*), the controller 14 for the host vehicle 10 can activate the warning indication system 22.

In one embodiment the headlight detection system 12, 12' can transmit a signal via the transceiver 20 to the remote vehicle 40, which can automatically activate the headlights of the remote vehicle 40. Moreover, the warning indication system 22 can include a signal that informs the driver of the remote vehicle 40 that the headlights of the remote vehicle 40 do not meet the prescribed light output and that the host vehicle 10 has activated the headlights of the remote vehicle 40.

Figure 7:
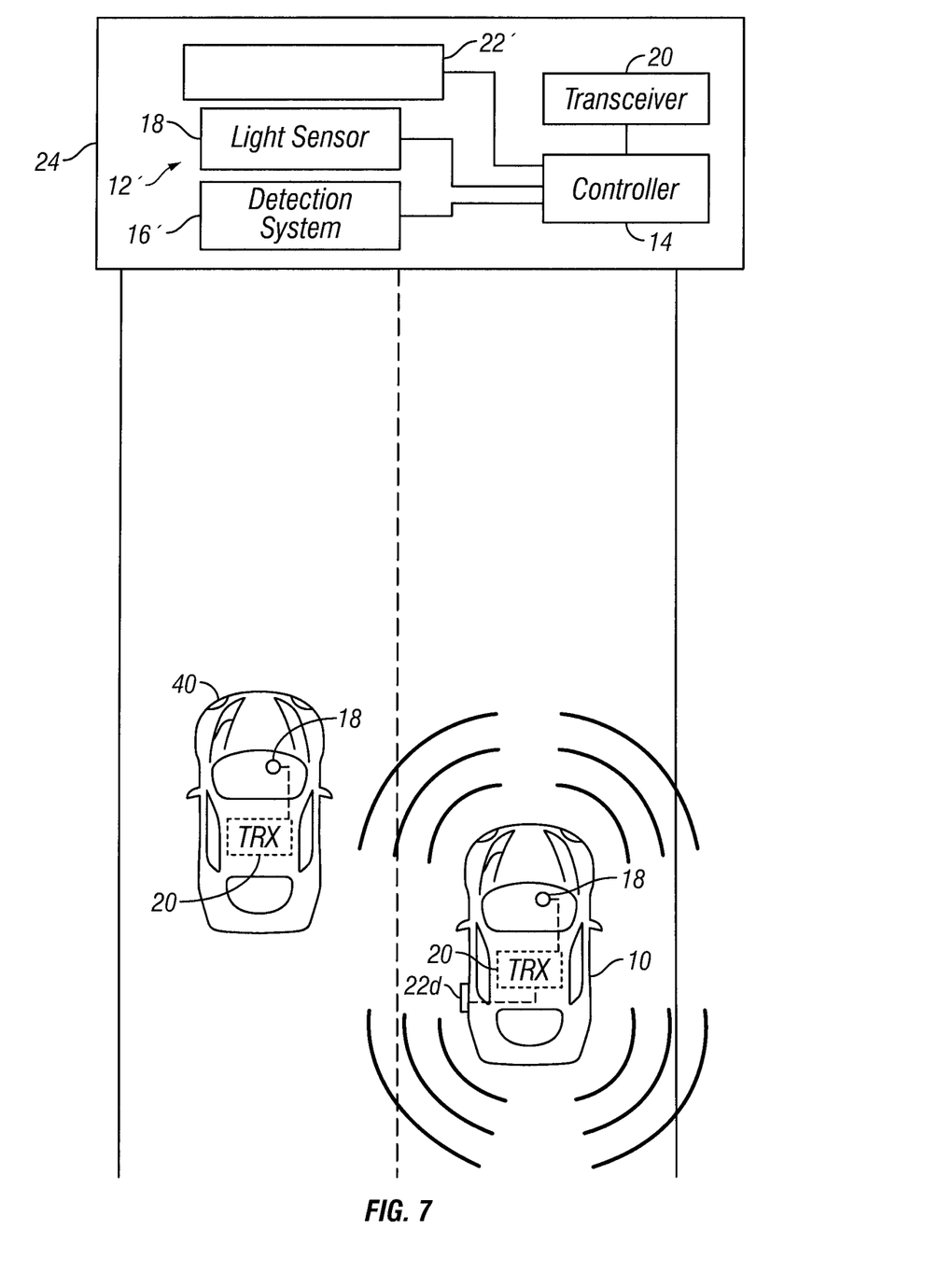
FIGS. 7 and 8 illustrate an exemplary scenario in which a host vehicle equipped with a vehicle headlight detection system according to a disclosed embodiment notifies a remote vehicle of insufficient light output and/or causes a road sign to notify the remote vehicle of insufficient light output.

FIGS. 7 and 8 illustrate one scenario in which disclosed embodiments of the headlight detection system 12, 12' are advantageous. As shown in FIG. 7, as the host vehicle 10 approaches the remote vehicle 40 from behind on a multilane road, the remote vehicle detection system 16 determines that the remote vehicle 40 is present. Then, the host vehicle 10 determines the ambient lighting conditions using light sensor 18. In this scenario, once the host vehicle 10 passes the remote vehicle 40 (i.e., the remote vehicle 40 passively moves through the detection zone), the headlight detection system 12 determines that the remote vehicle 40 is not emitting sufficient light. Then, as shown in FIG. 8, the host vehicle 10 activates external light 22*d*, which notifies the driver of the remote vehicle 40 that the headlights of the remote vehicle 40 are not emitting sufficient light. It is also suitable to activate any additional external light; however, for ease of explanation only the external light 22*d* is shown as being activated.

Additionally, as shown in FIG. 8, the host vehicle 10 can send a signal via transceiver 20 to a transceiver 20 in road sign 24 that causes the road sign 24 to activate warning indicator 22'. Moreover, as discussed above, if desired, the host vehicle 10 can send a signal to remote vehicle 40 that causes the light indicator 44 to be activated in the remote vehicle 40, indicating that the headlights of the remote vehicle 40 are not emitting sufficient light. If desired, the signal received by the remote vehicle 40 may also automatically activate the headlights of the remote vehicle 40, as discussed above.

Figure 9:
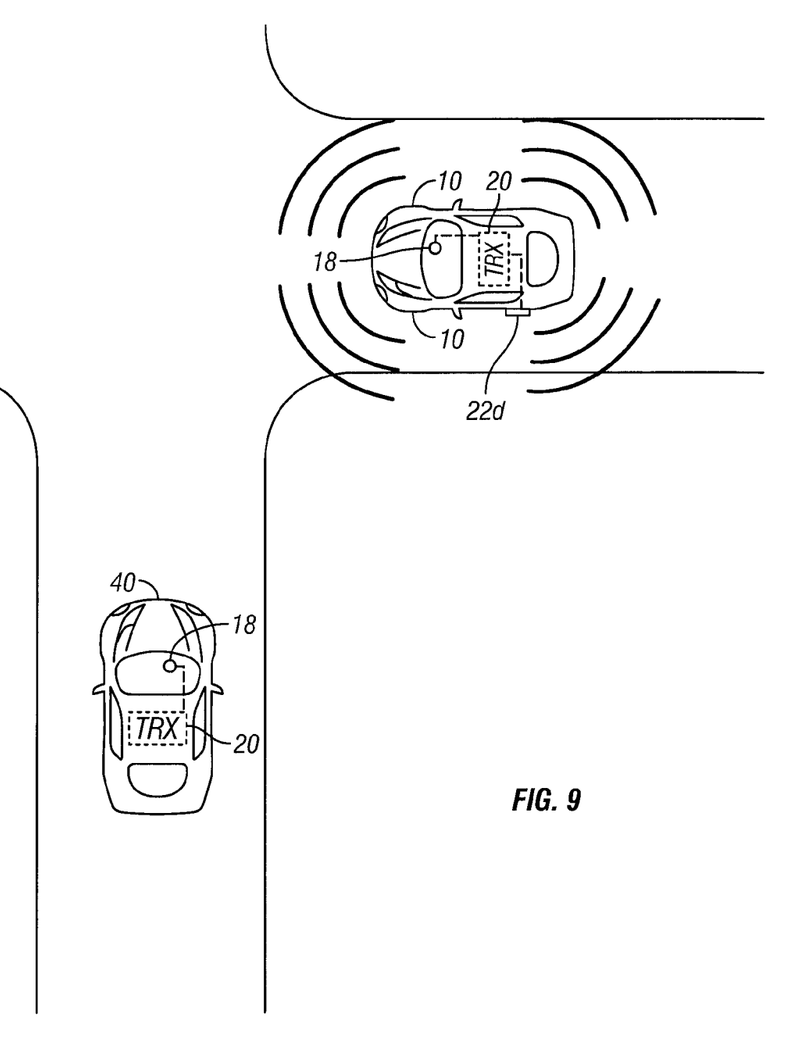
FIGS. 9 and 10 illustrate another exemplary scenario in which a host vehicle equipped with a vehicle headlight detection system according to a disclosed embodiment notifies a remote vehicle of insufficient light output.
Figure 10:
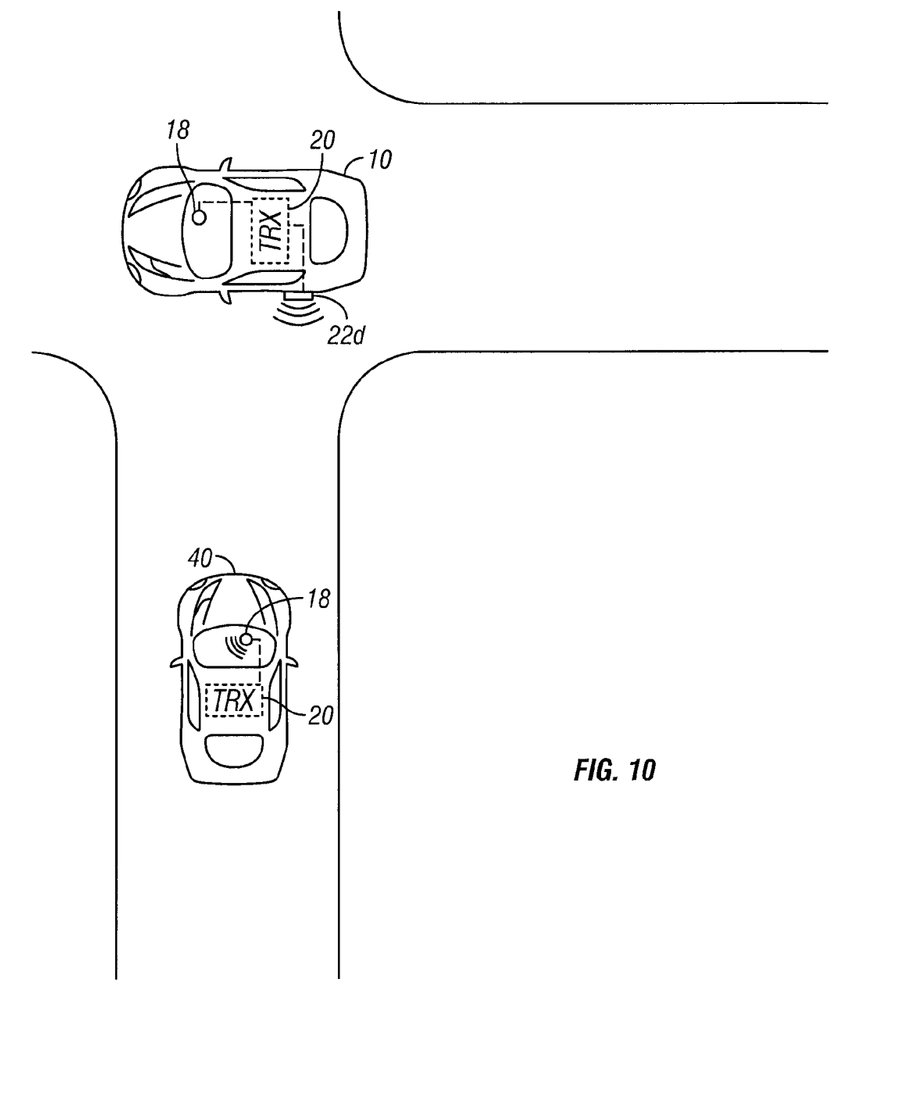

FIGS. 9 and 10 illustrate one scenario in which disclosed embodiments of the headlight detection system 12 are advantageous. As shown in FIG. 9, as the host vehicle 10 approaches the remote vehicle 40 from a transverse direction at an intersection, the remote vehicle detection system 16 determines that the remote vehicle 40 is present. Then, the host vehicle 10 determines the ambient lighting conditions using light sensor 18. In this scenario, once the host vehicle 10 passes the remote vehicle 40 (i.e., the remote vehicle 40 passively moves through the detection zone), the headlight detection system 12 determines that the remote vehicle 40 is not emitting sufficient light. Then, as shown in FIG. 10, the host vehicle 10 activates external light 22*d*, which notifies the driver of the remote vehicle 40 that the headlights of the remote vehicle 40 are not emitting sufficient light. It is also suitable to activate any additional external light; however, for ease of explanation only the external light 22*d* is shown as being activated.

Additionally, the host vehicle 10 can send a signal to remote vehicle 40 that causes the light indicator 44 to be activated in the remote vehicle 40, indicating that the headlights of the remote vehicle 40 are not emitting sufficient light. If desired, the signal received by the remote vehicle 40 may also automatically activate the headlights of the remote vehicle 40, as discussed above.

Figure 11:
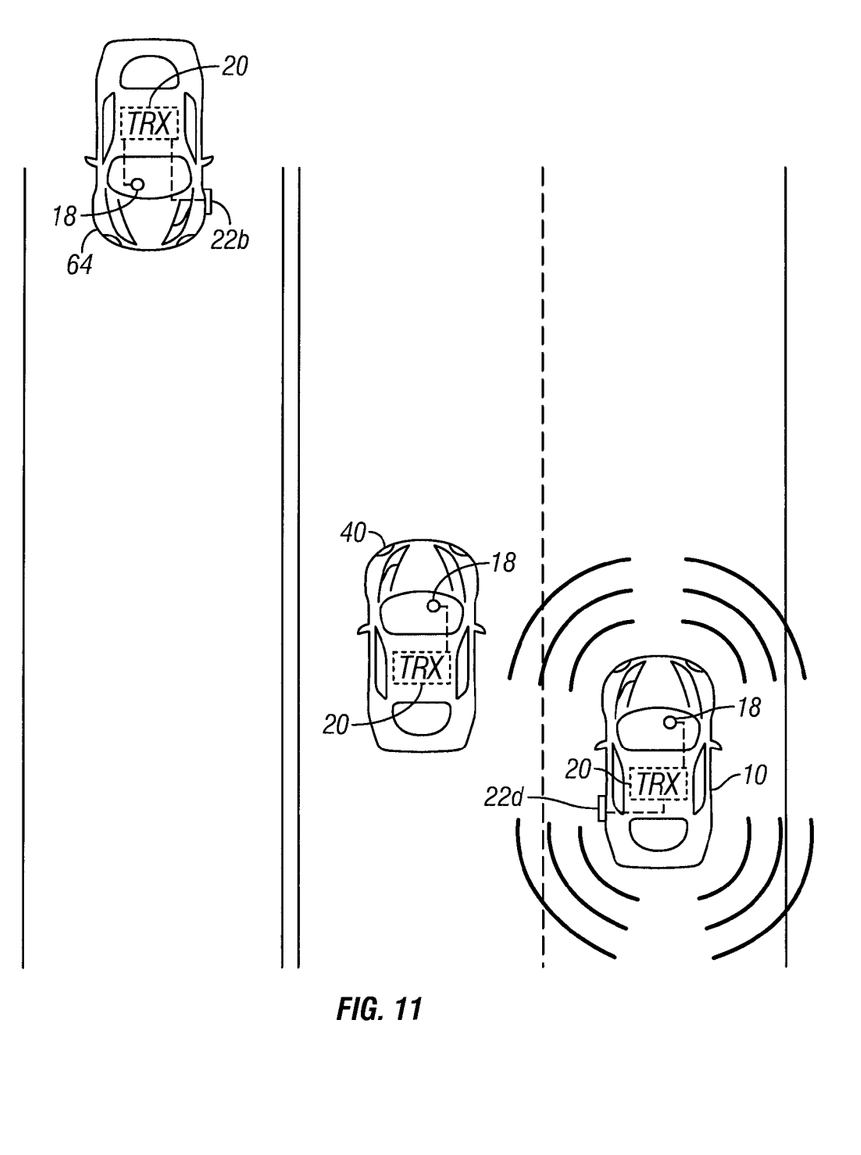
FIGS. 11 and 12 illustrate another exemplary scenario in which a host vehicle equipped with a vehicle headlight detection system according to a disclosed embodiment notifies a remote vehicle of insufficient light output or causes an adjacent vehicle to notify the remote vehicle of insufficient light output.
Figure 12:
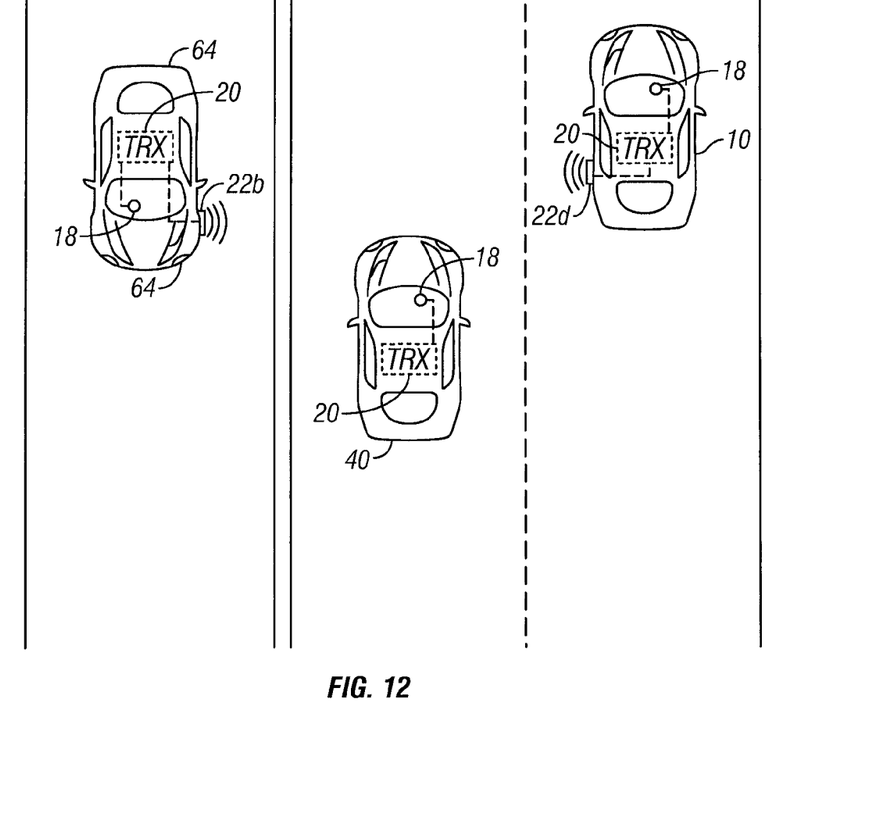

FIGS. 11 and 12 illustrate one scenario in which disclosed embodiments of the headlight detection system 12 are advantageous. As shown in FIG. 11, as the host vehicle 10 approaches the remote vehicle 40 from behind on a multilane road, the remote vehicle detection system 16 determines that the remote vehicle 40 is present. Then, the host vehicle 10 determines the ambient lighting conditions using light sensor 18. In this scenario, once the host vehicle 10 passes the remote vehicle 40 (i.e., the remote vehicle 40 passively moves through the detection zone), the headlight detection system 12 determines that the remote vehicle 40 is not emitting sufficient light. Then, as shown in FIG. 12, the host vehicle 10 activates external light 22*d*, which notifies the driver of the remote vehicle 40 that the headlights of the remote vehicle 40 are not emitting sufficient light. It is also suitable to activate any additional external light; however, for ease of explanation only the external light 22*d* is shown as being activated.

Additionally, as shown in FIG. 12, the host vehicle 10 can send a signal via transceiver 20 to a transceiver 20 in adjacent vehicle 64 that causes the adjacent vehicle 64 to activate warning indicator 22b. Moreover, as discussed above, if desired, the host vehicle 10 can send a signal to remote vehicle 40 that causes the light indicator 44 to be activated in the remote vehicle 40, indicating that the headlights of the remote vehicle 40 are not emitting sufficient light. If desired, the signal received by the remote vehicle 40 may also automatically activate the headlights of the remote vehicle 40, as discussed above.

FIGS. 13 and 14 illustrate one scenario in which disclosed embodiments of the headlight detection system 12, 12' are advantageous. As shown in FIG. 13, as the remote vehicle 40 approaches the stationary device 62 and/or road sign 24, the remote vehicle detection system 16' determines that the remote vehicle 40 is present. Then, the stationary device 62 and/or road sign 24 determines the ambient lighting conditions using light sensor 18. In this scenario, once the remote vehicle 40 passes or sufficiently approaches the stationary device 62 or the road sign 24 (i.e., the remote vehicle 40 actively moves through the detection zone), the headlight detection system 12, 12' determines that the remote vehicle 40 is not emitting sufficient light. Then, as shown in FIG. 14, the stationary device 62 and/or the road sign 24 activate warning indicator 22', which notifies the driver of the remote vehicle 40 that the headlights of the remote vehicle 40 are not emitting sufficient light.

Additionally, as shown in FIG. 14, the stationary device 62 can send a signal via transceiver 20 to a transceiver 20 in road sign 24 that causes the road sign 24 to activate warning indicator 22' (or vice versa). The stationary device 62 (or road sign 24) can further send a signal via transceiver 20 to a transceiver 20 in adjacent vehicle 64 that causes the adjacent vehicle 64 to activate warning indicator 22b. Moreover, as discussed above, if desired, the stationary device 62 (or road sign 24) can send a signal to remote vehicle 40 that causes the light indicator 44 to be activated in the remote vehicle 40, indicating that the headlights of the remote vehicle 40 are not emitting sufficient light. If desired, the signal received by the remote vehicle 40 may also automatically activate the headlights of the remote vehicle 40, as discussed above.

Note that the headlight detection system 12, 12' can be adapted to encompass scenarios other than those described above that involve the remote vehicle 40 passing the host vehicle 10 and/or the adjacent vehicle 64, as well as the host vehicle 10 and/or the adjacent vehicle 64 passing the remote vehicle 40. Therefore, the phrase "host vehicle 10 (and/or adjacent vehicle 64) passes the remote vehicle 40" can be substituted with "remote vehicle 40 passes the host vehicle 10 (and/or adjacent vehicle 64)" while still achieving the features an advantages of the headlight detection system 12, 12'. Any scenario that includes the remote vehicle 40 moving through a detection zone sufficient for the light sensor 18 to ascertain the light output of the remote vehicle (i.e., the brightness of the headlights of the remote vehicle 40) is contemplated herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part" or "portion" when used in the singular can have the dual meaning of a single part or a plurality of parts. Also as used herein to describe the above embodiments, the following directional terms "vertical" and "transverse" as well as any other similar directional terms refer to those directions of a vehicle equipped with the vehicle headlight detection system. Accordingly, these terms, as utilized to describe the present invention should be interpreted relative to a vehicle equipped with the vehicle headlight detection system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used, herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle headlight detection system comprising:
a vehicle sensor configured to detect a remote vehicle approaching the vehicle sensor;
a light sensor configured to detect a light output of the remote vehicle; and
a controller programmed to determine, based on the light output detected by the light sensor, whether the light output of the remote vehicle meets a predetermined minimum condition when the vehicle sensor detects the remote vehicle, and programmed to communicate with an indicator to notify a driver of the remote vehicle when the light output of the remote vehicle does not meet the predetermined minimum condition.

2. The vehicle headlight detection system according to claim 1, further comprising
a transmitter configured to transmit a signal indicating that the light output of the remote vehicle does not meet the predetermined minimum condition.

3. The vehicle headlight detection system according to claim 2, wherein
the transmitter is configured to transmit the signal to the remote vehicle so as to automatically activate a headlight of the remote vehicle.

4. The vehicle headlight detection system according to claim 2, wherein the transmitter is configured to transmit the signal to the remote vehicle, the indicator is an audible indicator, and, upon receipt of the signal from the transmitter, the remote vehicle is configured to activate the audible indicator.

5. The vehicle headlight detection system according to claim 2, wherein
the transmitter is configured to transmit the signal to an adjacent vehicle traveling adjacent to the remote vehicle,
the indicator is a visible indicator, and
upon receipt of the signal from the transmitter, the adjacent vehicle is configured to activate the visible indicator so as to be perceivable by an occupant of the remote vehicle.

6. The vehicle headlight detection system according to claim 2, wherein
the transmitter is configured to transmit the signal to an electronic road sign,
the indicator is a visible indicator, and
upon receipt of the signal from the transmitter, the electronic road sign is configured to activate the visible indicator so as to be perceivable by an occupant of the remote vehicle.

7. The vehicle headlight detection system according to claim 2, wherein
the transmitter is configured to transmit the signal to the remote vehicle,
the indicator is a visible indicator, and
upon receipt of the signal from the transmitter, the remote vehicle is configured to activate the visible indicator.

8. The vehicle headlight detection system according to claim 2, wherein
the vehicle headlight detection system is disposed in a host vehicle,
the vehicle sensor is further configured to detect an adjacent vehicle traveling adjacent to the remote vehicle in an opposite direction of both the remote vehicle and the host vehicle,
the transmitter is configured to transmit the signal to the adjacent vehicle,
the indicator is a visible indicator, and
upon receipt of the signal from the transmitter, the adjacent vehicle is configured to activate the visible indicator so as to be perceivable by an occupant of the remote vehicle.

9. The vehicle headlight detection system according to claim 1, further comprising
a global positioning system (GPS) configured to determine a number of traveling lanes of a road on which the remote vehicle is traveling, with the controller being configured to activate the vehicle headlight detection system only when the GPS determines that the number of traveling lanes is two or more in a direction of travel of the remote vehicle.

10. The vehicle headlight detection system according to claim 1, wherein
the light sensor is configured to take multiple readings within a predetermined period of time while the controller determines the light output of the remote vehicle.

11. The vehicle headlight detection system according to claim 1, wherein
the indicator is a visible indicator.

12. A vehicle headlight detection system comprising:
a vehicle sensor configured to detect one of a remote vehicle approaching a host vehicle equipped with the vehicle headlight detection system or the host vehicle approaching the remote vehicle;
a light sensor configured to detect a light output of the remote vehicle;
a controller programmed to determine, based on the light output detected by the light sensor, whether the light output of the remote vehicle meets a predetermined minimum condition when the vehicle sensor detects the remote vehicle; and
an indicator configured to notify a driver of the remote vehicle that the predetermined minimum condition is not met.

13. The vehicle headlight detection system according to claim 12, further comprising
a transmitter configured to transmit a signal indicating that the light output of the remote vehicle does not meet the predetermined minimum condition.

14. The vehicle headlight detection system according to claim 13, wherein
the transmitter is configured to transmit the signal to the remote vehicle so as to automatically activate a headlight of the remote vehicle.

15. The vehicle headlight detection system according to claim 13, wherein
the transmitter is configured to transmit the signal to an adjacent vehicle traveling adjacent to the remote vehicle,
the indicator is a visible indicator, and
upon receipt of the signal from the transmitter, the adjacent vehicle is configured to activate the visible indicator so as to be perceivable by an occupant of the remote vehicle.

16. The vehicle headlight detection system according to claim 13, wherein
the transmitter is configured to transmit the signal to an electronic road sign,
the indicator is a visible indicator, and
upon receipt of the signal from the transmitter, the electronic road sign is configured to activate the visible indicator so as to be perceivable by an occupant of the remote vehicle.

17. The vehicle headlight detection system according to claim 12, wherein
the indicator is a light on a rear quarter panel of the host vehicle.

18. The vehicle headlight detection system according to claim 12, further comprising
a global positioning system (GPS) configured to determine a number of traveling lanes of a road on which the host vehicle is traveling, with the controller being configured to activate the vehicle headlight detection system only when the GPS determines that the number of traveling lanes is two or more in a direction of travel of the host vehicle.

19. The vehicle headlight detection system according to claim 12, wherein
the light sensor is configured to take multiple readings within a predetermined period of time while the controller determines the light output of the remote vehicle.

20. The vehicle headlight detection system according to claim 12, wherein
the light sensor is mounted on an instrument panel of the host vehicle and is configured to automatically operate headlamps of the host vehicle based on ambient lighting conditions.

* * * * *